(12) United States Patent
Baldini

(10) Patent No.: US 8,230,976 B2
(45) Date of Patent: Jul. 31, 2012

(54) PALLET TRUCK WITH CALCULATED FORK CARRIAGE HEIGHT

(75) Inventor: Augustus R. Baldini, Binghamton, NY (US)

(73) Assignee: The Raymond Corporation, Greene, NY (US)

(*) Notice: Subject to any disclaimer, the term of this patent is extended or adjusted under 35 U.S.C. 154(b) by 943 days.

(21) Appl. No.: 12/104,060

(22) Filed: Apr. 16, 2008

(65) Prior Publication Data

US 2009/0260923 A1 Oct. 22, 2009

(51) Int. Cl.
*B66F 9/06* (2006.01)
(52) U.S. Cl. ....................................................... 187/226
(58) Field of Classification Search .................... 187/226
See application file for complete search history.

(56) References Cited

U.S. PATENT DOCUMENTS

| | | | |
|---|---|---|---|
| 3,524,522 A * | 8/1970 | Thomas et al. ............... | 187/223 |
| 4,265,337 A * | 5/1981 | Dammeyer .................... | 187/224 |
| 4,411,582 A | 10/1983 | Nakada | |
| 4,499,541 A | 2/1985 | Yuki et al. | |
| 4,509,127 A | 4/1985 | Yuki et al. | |
| 4,517,645 A * | 5/1985 | Yuki et al. ...................... | 701/50 |
| 4,520,443 A * | 5/1985 | Yuki et al. ...................... | 701/50 |
| 4,598,797 A | 7/1986 | Schultz | |
| 4,782,920 A | 11/1988 | Gaibler et al. | |
| 4,942,529 A * | 7/1990 | Avitan et al. .................... | 701/50 |
| 5,011,358 A | 4/1991 | Andersen et al. | |
| 5,022,496 A | 6/1991 | Klopfleisch et al. | |
| 5,341,695 A | 8/1994 | Avitan | |
| 5,526,673 A * | 6/1996 | Avitan ........................... | 73/1.81 |
| 5,749,696 A | 5/1998 | Johnson | |
| 5,791,440 A * | 8/1998 | Lonzinski et al. ............. | 187/223 |
| 5,995,001 A * | 11/1999 | Wellman et al. ............... | 340/438 |
| 6,138,795 A | 10/2000 | Kamiya | |
| 6,140,594 A | 10/2000 | Ishikawa et al. | |
| 6,236,927 B1 * | 5/2001 | Sherman ........................ | 701/70 |

(Continued)

FOREIGN PATENT DOCUMENTS

EP 1 447 377 A1 8/2004
(Continued)

OTHER PUBLICATIONS

European Search Report dated Mar. 26, 2010.

*Primary Examiner* — William E Dondero
*Assistant Examiner* — Minh Truong
(74) *Attorney, Agent, or Firm* — Quarles & Brady LLP

(57) ABSTRACT

A pallet truck including a controller that calculates the height of the fork carriage without the use of mechanical devices such as switches or sensors. A calculated carriage height is derived by adding the amount of time that a carriage is commanded to be raised and offsetting that by the amount of time that the carriage lower button is depressed. The calculated carriage height is essentially an accumulated lift time where the time that the carriage is lifting is a positive value and the time that the carriage is lowering is a negative value. When these values are combined, the result is the present calculated carriage height. The controller further monitors the calculated carriage height such that if the carriage is too close to the ground, the maximum speed of the pallet truck is limited to prevent damage to the forks or ground due to striking or scraping between them.

17 Claims, 3 Drawing Sheets

U.S. PATENT DOCUMENTS

| | | |
|---|---|---|
| 6,269,913 B1 | 8/2001 | Kollmannsberger et al. |
| 6,286,629 B1 | 9/2001 | Saunders |
| 6,296,081 B1 * | 10/2001 | Nagai et al. .................. 187/394 |
| 6,533,076 B1 | 3/2003 | Haverfield et al. |
| 7,025,157 B2 | 4/2006 | Lindsay et al. |
| 7,287,625 B1 * | 10/2007 | Harris ........................ 187/282 |
| 7,568,547 B2 * | 8/2009 | Yamada et al. .............. 180/306 |
| 2004/0031649 A1 | 2/2004 | Schiebel et al. |
| 2005/0154504 A1 * | 7/2005 | Fenelli ............................ 701/1 |
| 2005/0281656 A1 * | 12/2005 | Bozem et al. ................ 414/635 |
| 2006/0089778 A1 * | 4/2006 | Lindsay et al. ................ 701/70 |
| 2007/0069907 A1 * | 3/2007 | Magens et al. .............. 340/679 |

FOREIGN PATENT DOCUMENTS

| | | |
|---|---|---|
| EP | 1 655 211 A2 | 5/2006 |
| GB | 2 313 209 A | 11/1997 |

* cited by examiner

US 8,230,976 B2

PALLET TRUCK WITH CALCULATED FORK CARRIAGE HEIGHT

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

This invention relates to material handling apparatus, and more particularly, to a pallet truck that calculates the height of a vertically moveable fork carriage without the use of mechanical devices such as switches or sensors.

BACKGROUND OF THE INVENTION

Electrically powered low-lift pallet trucks are common in the warehousing industry. These trucks are designed to travel at varying speeds while carrying a load supported by a pallet on a vertically displaceable fork carriage. Driving a pallet truck while the fork carriage is close to the ground may result in damage to the warehouse floor, the fork carriage or pallet caused by inadvertent contact, such as striking or scraping, with the floor. When operating on an uneven or rough floor, the pallet truck or its load may wobble or shift, increasing the potential for scraping between the floor and fork carriage. Further, contact with the floor while traveling may cause the pallet or load to shift and even spill.

To prevent this situation, a number of pallet truck manufacturers limit travel speed of the pallet truck when the fork carriage is below a minimum height. Although designed to prevent a different problem, a number of forklift manufacturers also limit travel speed, though only when the fork carriage is too high and may cause the forklift to tip over. Despite the differences, both applications use the height of the fork carriage to limit truck performance. It is therefore important to have an accurate and reliable means for determining the carriage height of material handling vehicle.

In response, a number of height determining technologies or algorithms have been employed with varying results. One common approach is to use limit switches, proximity sensors, or the like mounted at fixed heights that directly sense the position of the fork carriage. This information is then inputted to a vehicle controller. In one control methodology for a pallet truck, when the fork carriage is sensed to be above a predetermined height, high speed operation is enabled. When the carriage is sensed to be lower than the predetermined height, the maximum allowable travel speed of the truck is limited appropriately.

This type of control methodology works well as long as all of the height sensors or switches are functioning properly. However, mechanical sensors and switches may wear out, become misaligned, suffer physical abuse, have signal wiring become disconnected either intentionally or unintentionally, and generally suffer from various problems known to both designers and users of forklifts and pallet trucks alike. These problems are exacerbated by the continuous use, constant abuse, hostile environments, and limited maintenance that many pallet trucks endure. Furthermore, sensors and switches, especially when multiples ones are used in redundant systems, increase the manufacturing and maintenance costs associated with pallet trucks over their serviceable life. The present invention addresses these issues.

SUMMARY OF THE INVENTION

In one aspect, the present invention provides a pallet truck comprising a power unit including a traction motor for driving the truck, a vertically displaceable carriage having a pair of load bearing forks or platform coupled to the power unit, and an actuator for raising the carriage vertically. A controller is configured to store a value corresponding to a present height of the carriage, monitor the actuator for an input signal to drive the carriage, and direct a vertical movement of the carriage in response to the input signal. The controller measures a length of time the carriage is directed to move in a vertical direction, and adjusts the stored value corresponding to the height of the carriage by an amount corresponding to the length of time the carriage is directed to move. The value corresponding to the height of the carriage is compared to a predetermined minimum height value, and the maximum travel speed of the pallet truck is limited if the value corresponding to the carriage height is less than the minimum height value.

In another aspect of the invention, a method for operating a pallet truck without the use of height-indicating devices is provided. The method comprises the steps of obtaining a fork carriage height expressed as a function of time, tracking an increment of time a control device commands a vertical carriage movement, and adjusting the fork carriage height by the increment of time the control device commands a vertical carriage movement. The fork height is compared to a predetermined minimum carriage travel height, and the travel speed of the pallet truck is limited if the fork carriage height is less than the minimum carriage travel height.

In another aspect the present invention provides a pallet truck having a controller configured to calculate the height of the carriage without the use of mechanical devices such as switches and sensors. The controller maintains a calculated carriage height, expressed as an amount of carriage lift time, for example, two seconds. Each duration of time that the operator requests a carriage lift and lower command is tracked and the calculated carriage height is adjusted upwards or downwards accordingly. Alternatively, each duration of time that the controller directs the carriage to be lifted or lowered is tracked and the calculated carriage height is adjusted accordingly.

According to a preferred embodiment, the pallet truck includes a microprocessor having an internal memory and a timer. The microprocessor controls the operation of the pallet truck, including monitoring for inputs and commanding output devices, by executing operating code stored in the memory. The microprocessor monitors the status of the carriage lift and carriage lower command buttons and tracks either the length of time one is depressed or the length of time the carriage is commanded to be lifted or lowered. The microprocessor adjusts the calculated carriage height stored in memory at regular increments by adding each increment of time to the calculated carriage height stored in memory. In some applications, the height value can also be adjusted down by subtracting from the height value during a lowering movement. The calculated carriage height can also be retained in non-volatile memory so that it is available upon pallet truck startup. The microprocessor further limits the maximum allowable speed of the pallet truck if the carriage is too close to the ground.

In another aspect of the invention, if the carriage is commanded to be lowered for a length of time greater than that required to fully lower the carriage, the microprocessor sets the calculated carriage height to zero. Similarly, if the carriage is commanded to be lifted for a length of time greater than that required to fully raise the carriage, the microprocessor sets the calculated carriage height to the maximum carriage height. In a similar aspect, an initialization procedure may lower (or raise) the fork carriage for a period of time longer than that required to fully lower (or raise) the carriage. The microprocessor subsequently initializes the calculated carriage height to the appropriate amount of lift time.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
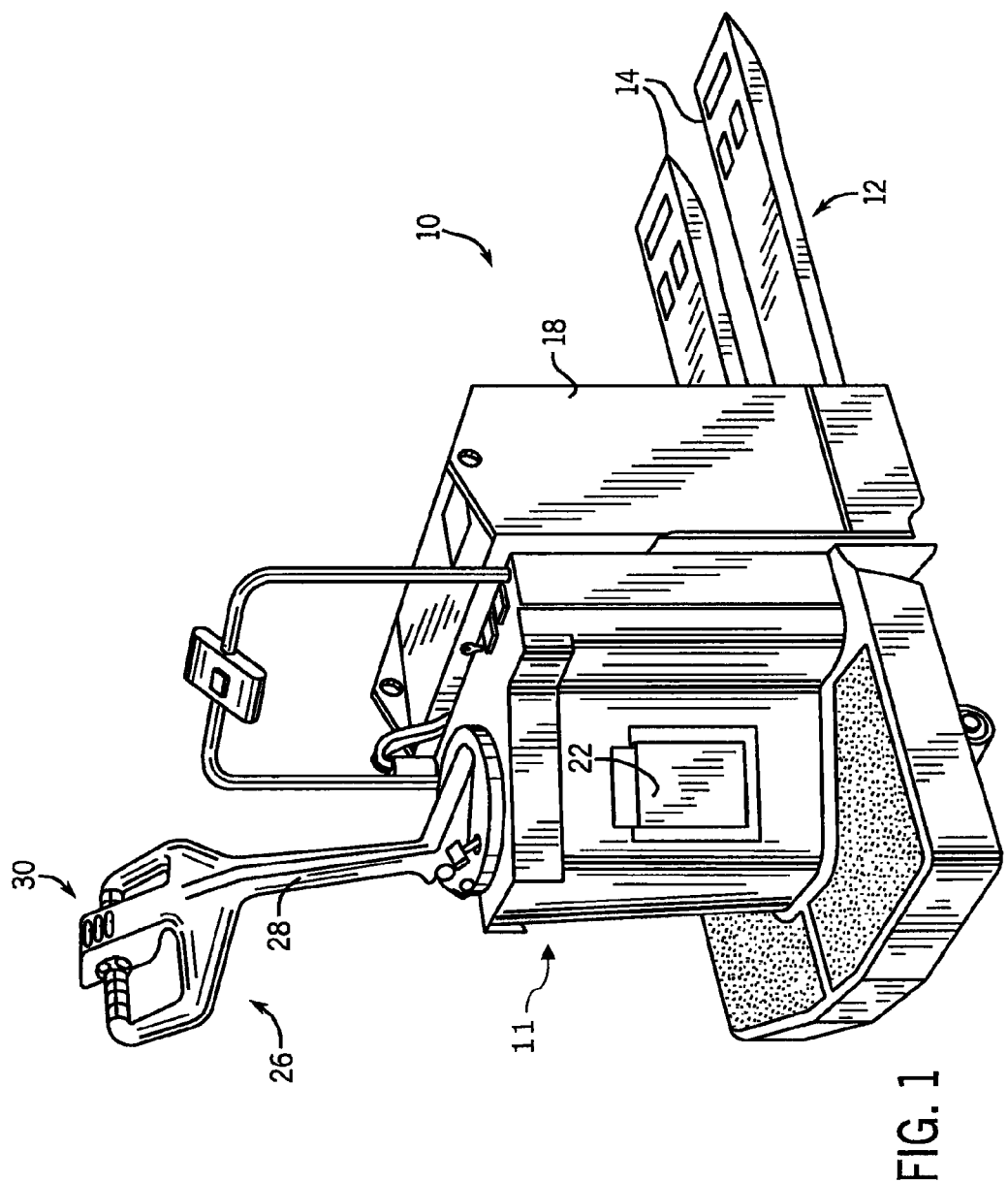
FIG. 1 is a perspective view of a pallet truck.

Referring to FIG. 1, a motorized hand/rider low-lift pallet truck 10 is comprised of fork carriage 12 having a pair of load bearing forks 14 that are coupled to a power unit 11. The power unit 11 includes a housing 22 that houses a hydraulic lift motor pump 16 (FIG. 2) and traction motor 24 (FIG. 2), a drive wheel (not shown), and a battery housing 18 that houses a battery 20. The drive wheel is coupled to a steering mechanism 26 having a tiller arm 28 and an operator control handle 30. The steering mechanism 26 is rotatable to the right and left to control the steering of the pallet truck 10. Although the battery 20 is shown here as provided within a housing 18, the battery can also be mounted directly to the pallet truck 10, without a housing 18.

The fork carriage 12 has a vertical span of several inches, traveling up and down between ground level and the maximum height. The pallet truck 10 is designed such that the forks 14 are inserted under a load to be moved such as a pallet of goods and the fork carriage 12 lifts the load completely off of the ground. The pallet truck 10 may be driven to another location where the fork carriage 12 is lowered to place the load on the ground and the forks 14 are withdrawn from the load.

Figure 2:
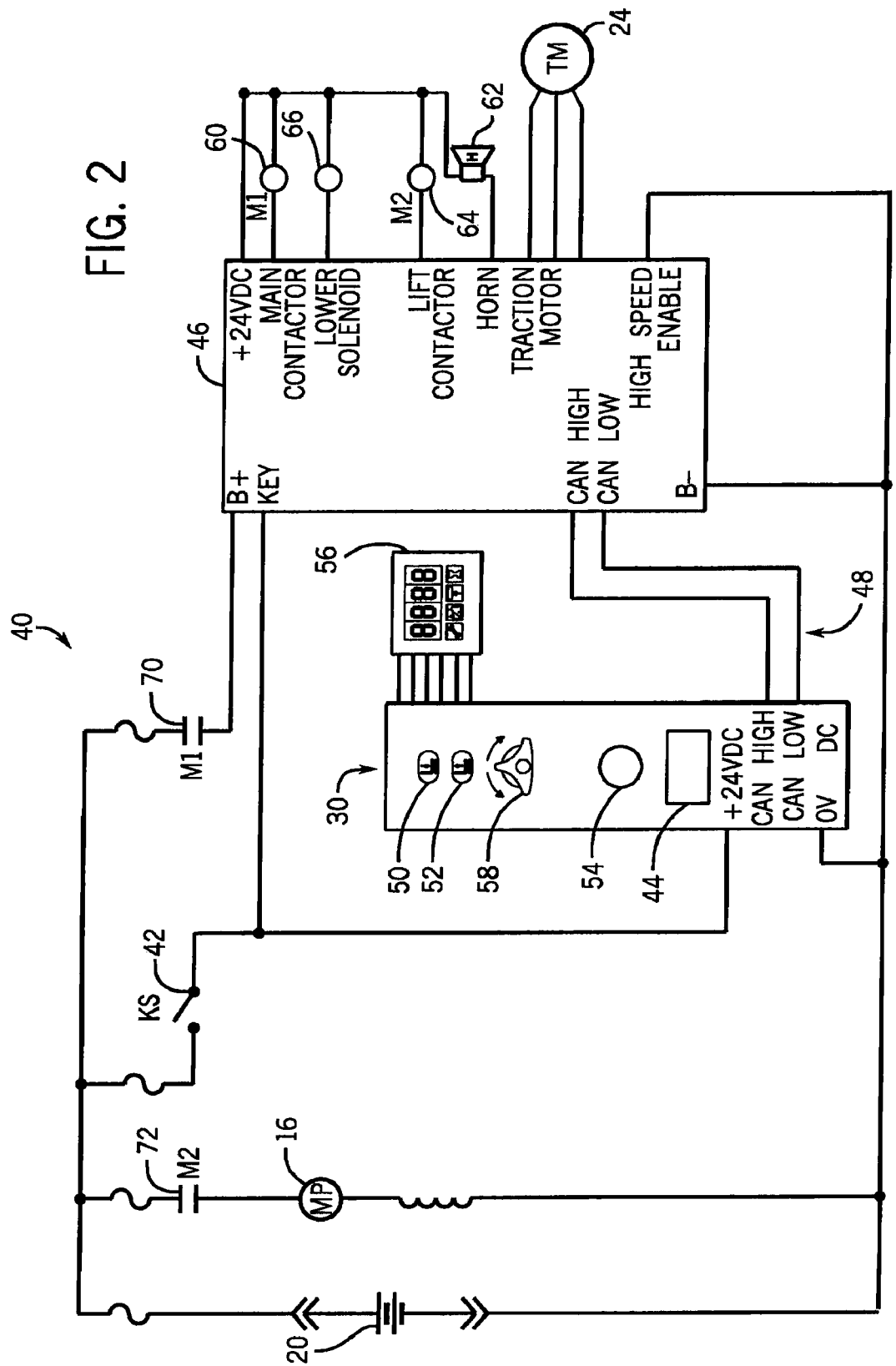
FIG. 2 is a block diagram of a portion of the control circuit of the pallet truck of FIG. 1.

Referring now also to FIG. 2, a block diagram of one embodiment of a control system 40 of the pallet truck 10 is shown. The control system 40 is powered by the battery 20 and activated by a key switch 42. The control system 40 further includes a microprocessor 44 contained within the operator control handle 30 and a motor controller, or power amplifier, 46. The microprocessor 44 and motor controller 46 communicate through a CAN (controller area network) bus 48.

The control handle 30 further includes a number of switches and actuators connected to or monitored by the microprocessor 44. The operator controls include, but are not limited to, a carriage lift button 52, a carriage lower button 50, a horn button 54, and a display 56. The display 56 can provide pertinent data such as battery charge status, hour meter data, and other operational information. The control handle 30 also includes a directional (i.e., forward or reverse) and speed control actuator, such as a thumbwheel or twist grip 58. The twist grip 58 is selectively actuated in a first direction to produce a control signal for movement of the pallet truck 10 in a forward direction and actuated in a second direction to produce a control signal for movement of the pallet truck 10 in a reverse direction. The twist grip 58 is selectively actuated in either direction through a range corresponding to a zero travel speed and the maximum travel speed of the pallet truck 10.

The status of each of the switches, buttons, and other actuators comprising the inputs in the control handle 30 are continuously monitored by the microprocessor 44. The statuses of these inputs are regularly communicated from the microprocessor 44 to the motor controller 46 via the CAN bus 48. Based on the status of the inputs, the motor controller 46 activates or deactivates a main contactor 60, a horn 62, a carriage lift contactor 64, and a carriage lower solenoid 66. The motor controller 46 further performs as a variable drive for the pallet truck 10 by regulating the speed output to the traction motor 24 in accordance with the position of the twist grip 58.

The key switch 42 is activated to apply logic power to the control handle 30 and the motor controller 46, placing the pallet truck 10 in an operational mode. After the key switch 42 is activated, control handle 30 is energized, an operator is able to provide directional and functional control requests to the pallet truck 10 through the aforementioned controls. For example, a power on request selected by an operator is detected by the microprocessor 44 and communicated to the motor controller 46 over the CAN bus 48. After the key switch 42 is activated, a capacitor bank (not shown) used for a high-power motor inverter stage is charged. When the bank is charged, the controller 46 energizes the main contactor 60, closing normally open contact 70 and allowing full operational power from the battery 20 to be applied to the motor controller 46.

Upon detecting a lift request (i.e., carriage lift button 50 is depressed), the motor controller 46 energizes the lift contactor 64, closing normally open contact 72 and allowing power to be applied to the hydraulic lift motor pump 16. In one embodiment, vertical movement of the carriage 12 is accomplished by a hydraulic cylinder (not shown) and piston (not shown) connected to the carriage 12, such as the hydraulic system disclosed in U.S. Pat. No. 5,341,695, incorporated herein by reference. When energized, the lift motor pump 16 pumps hydraulic fluid into the cylinder to lift the piston and carriage 12 to a desired height, at a rate that is dependent on the weight of the load. If the carriage lift button 52 is depressed after the carriage 12 is fully elevated, the lift motor pump 16 continues to operate but a hydraulic bypass line (not shown) is provided to prevent excessive pressure in the cylinder.

When the lift motor pump 16 is de-energized, the carriage 12 is held in place by the static pressure in the cylinder. When the carriage lower button 50 is depressed, the carriage lower solenoid 66 is energized, opening a hydraulic fluid return path and allowing the fluid to be pushed out of the cylinder. The carriage 12 may lower at a constant rate or may lower at a variable rate depending on the weight of the load, for example, heavier loads being lowered faster by force of gravity. If the carriage lower button 50 is depressed after the carriage 12 is at the lowermost position, the solenoid 66 will be energized but the carriage 12 will not descend further as all of the hydraulic fluid will have been expelled from the cylinder.

Figure 3:
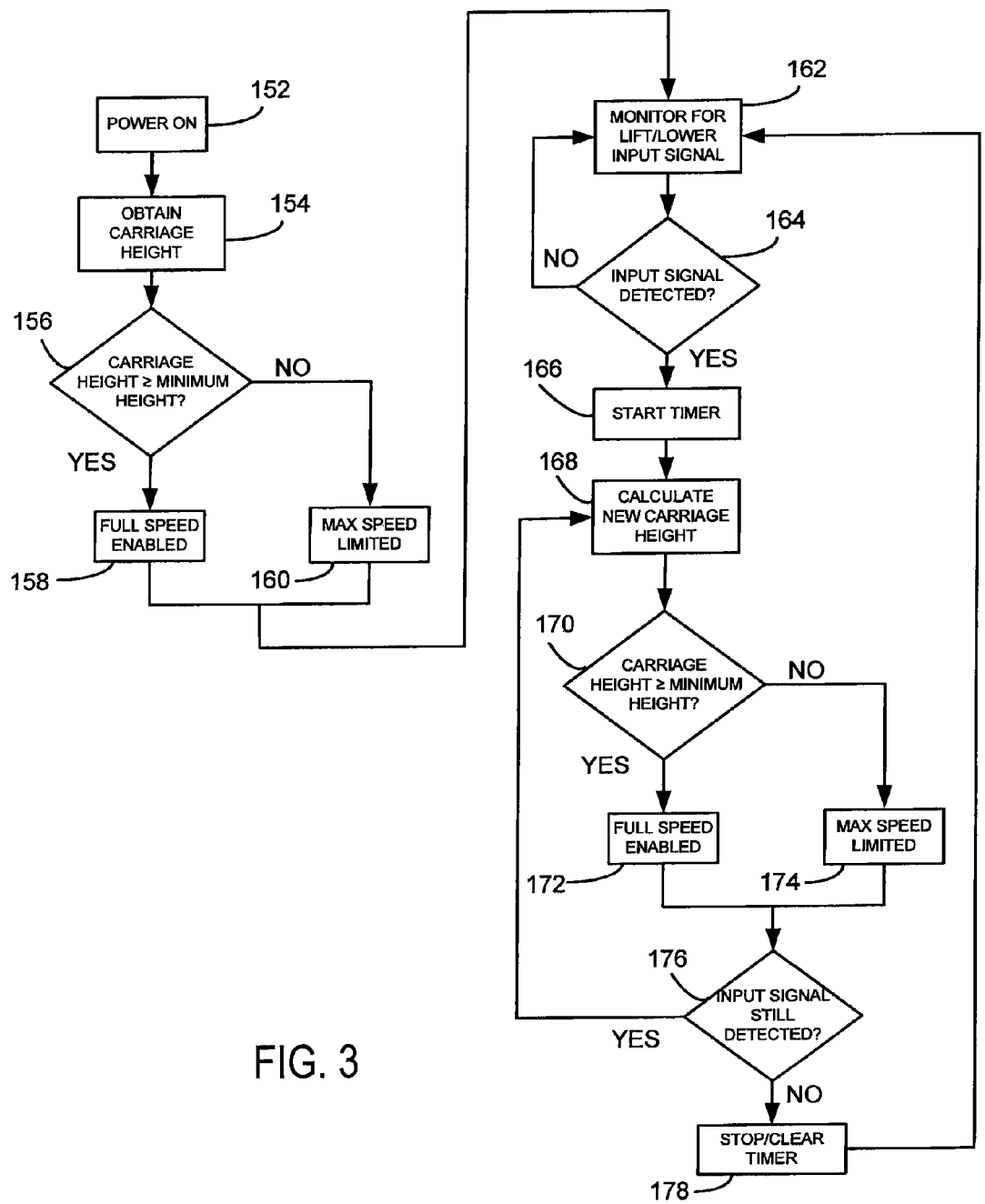
FIG. 3 is a flow chart illustrating a process for inferring the height of the fork carriage of the pallet truck of FIG. 1 and controlling the travel speed accordingly.

Referring now also to FIG. 3, in operation and upon activation of the key switch 42 (step 152), the microprocessor 44 starts executing a program of operating code stored in non-volatile memory. A previously calculated fork carriage height is retrieved from memory (step 154). Alternatively, an initialization procedure may be performed whereby the fork carriage 12 is lowered (or raised) for a period of time longer than that required to fully lower (or raise) the carriage 12 and subsequently the calculated carriage height is set to the appropriate initialized value.

The microprocessor 44 then compares the calculated carriage height to a predetermined minimum travel height (step 156). If the carriage 12 is above or equal to the minimum travel height, full speed operation is enabled (block 158). If, however, the calculated carriage height is less than the minimum travel height, a speed limit is imposed (step 160) on the pallet truck 10. According to one embodiment, the microprocessor 44 controls the speed of the pallet truck 10 by communicating a travel speed command for the traction motor 24 to the motor controller 46. For example, when full speed operation is enabled, the travel speed command communicated to the motor controller 46 ranges from zero to 4500 RPM. When a speed limit imposed, the truck travel speed command ranges from zero to 2000 RPM.

During operation, the microprocessor 44 continuously monitors for input signals from the carriage lift button 52 and carriage lower button 50 (step 162). If an input signal is detected (step 164), for example, a discrete signal received from one of the buttons 50, 52, the microprocessor communicates a command to the motor controller 46 to energize the carriage lift contactor 64 or the lower solenoid 66, respectively.

When an input signal is detected, the microprocessor 44 further begins to track the time that the input signal is detected (step 166). In one embodiment, the time is tracked by using a timer internal to the microprocessor 44. The calculated carriage height is then incrementally adjusted upwardly (when lifting) or downwardly (when lowering) (step 168) each time the microprocessor 44 executes a cycle of the operating program, for example, every twenty milliseconds. After the calculated carriage height has been upwardly or downwardly adjusted, the microprocessor 44 compares the calculated carriage height to the predetermined minimum travel height (step 170). As described above, if the carriage 12 is above or equal to the minimum travel height, full speed operation is enabled (step 172). If the carriage 12 is below the minimum height, a speed limit is either imposed or maintained (step 174). After the input signal is no longer detected (step 176), the timer is stopped and cleared. While the pallet truck 10 is operational, the microprocessor 44 continues to monitor for input signals (step 162).

Because the carriage height is calculated substantially in real time, the microprocessor 44 can respond to changes in carriage height even if the pallet truck 10 is moving quickly. For example, if the carriage 12 is lowered below the minimum travel height while the pallet truck 10 is traveling at full speed, a speed limit will be imposed and the pallet truck 10 will be slowed quickly, ideally before any damage-causing contact occurs between the carriage 12 and the ground.

In a contemplated embodiment of the present invention, if the microprocessor 44 calculates a carriage height that is less than zero, such as when an operator continues to depress the carriage lower button 50 after the carriage 12 is completely lowered, the microprocessor 44 sets the calculated carriage height to zero. However, on a floor where the carriage 12 cannot be completely lowered, such as on an uneven or rough floor, such an action may result in a "zeroing out" effect at a slightly elevated height. Conversely, if the calculated carriage height is greater than the maximum possible carriage height, the microprocessor 44 sets the calculated carriage height to the maximum vertical displacement of the carriage 12.

In a further contemplated embodiment, the calculated carriage height is corrected by monitoring the current flow to the hydraulic lift motor pump 16. An appreciably heavier load may cause the lift motor pump 16 to lift the carriage 12 at a slower rate. This can be detected by monitoring for an increase in current to the lift motor pump 16. In such a case, the calculated carriage height is decreased by an amount corresponding to the reduced rate of lifting. Other parameters may also be used for adjusting the calculated carriage height including lift motor pump operational status, lift motor pump RPM, hydraulic fluid pressure, flow and temperature.

Preferred embodiments and examples of the invention have been described in considerable detail. Many modifications and variations to the preferred embodiment described will be apparent to a person of ordinary skill in the art. It should be understood, therefore, that the methods and apparatuses described above are only illustrative and do not limit the scope of the invention, and that various modifications could be made by those skilled in the art that would fall within the scope of the invention.

I claim:

1. A pallet truck comprising:
   a traction motor for driving the truck;
   a vertically displaceable carriage having a pair of load bearing forks coupled to the traction motor;
   an actuator for driving the carriage vertically; and
   a controller configured to:
      store a value corresponding to a present height of the carriage;
      monitor the actuator for an input signal to drive the carriage;
      direct a vertical movement of the carriage in response to the input signal;
      measure a length of time the carriage is directed to move in a vertical direction;
      adjust the stored value corresponding to the height of the carriage by an amount corresponding to the length of time the carriage is directed to move;
      compare the value corresponding to the height of the carriage to a predetermined minimum travel height value; and
      reduce a maximum allowable travel speed of the pallet truck if the value corresponding to the carriage height is less than the minimum travel height value.

2. The pallet truck of claim 1, wherein the controller is configured to limit the maximum allowable travel speed by reducing a maximum output to the traction motor.

3. The pallet truck of claim 1, wherein the value corresponding to the height of the carriage is an accumulated lift time; wherein the vertical movement directed by the controller is one of: lifting the carriage and lowering the carriage; and wherein the accumulated lift time corresponding to the height of the carriage is determined by adding a length of time the carriage is directed to be lifted and subtracting a length of time the carriage is directed to be lowered.

4. The pallet truck of claim 1, wherein the actuator comprises:
   a first operator-actuated input connected to the controller to request a carriage lifting movement; and
   a second operator-actuated input connected to the controller to request a carriage lowering movement;
   wherein the controller is further configured to adjust the stored value corresponding to the height of the carriage to a predetermined maximum carriage height when the stored value corresponding to the height of the carriage is greater than the predetermined maximum carriage height.

5. The pallet truck of claim 4, wherein the predetermined maximum carriage height is within a range between 4 inches and 10 inches.

6. The pallet truck of claim 4, wherein the predetermined maximum carriage height is a maximum possible carriage height.

7. The pallet truck of claim 1, wherein the controller is further configured to adjust the stored value corresponding to the height of the carriage to a predetermined minimum height when the stored value corresponding to the height of the carriage is less than the predetermined minimum carriage height.

8. The pallet truck of claim 7, wherein the predetermined minimum carriage height is the height of the carriage in a completely lowered position.

9. The pallet truck of claim 1, wherein the actuator comprises a lift actuator for providing an input signal for lifting the carriage and a lowering actuator for providing an input signal for lowering the carriage.

10. The pallet truck of claim 1, wherein the controller is further configured to:
  compare the accumulated carriage lift time to a carriage lift time representing a predetermined minimum travel height; and
  limit the maximum allowable travel speed of the pallet truck if the accumulated carriage lift time is less than the carriage lift time representing a minimum travel height.

11. A method of operating a pallet truck having a vertically extensible fork carriage, the method comprising the steps of:
  obtaining a fork carriage height value expressed as a function of time;
  tracking an increment of time that a control device commands the carriage to move vertically;
  adjusting the fork carriage height value by the increment of time the control device commands the carriage to move vertically;
  comparing the fork carriage height value to a predetermined minimum carriage travel height value; and
  reducing a maximum allowable travel speed of the pallet truck if the fork carriage height value is less than the minimum carriage travel height value.

12. The method of claim 11, wherein the control device is a microprocessor.

13. The method of claim 11, wherein the control device is an operator-actuated input.

14. The method of claim 11, including the step of adjusting the fork carriage height value to a predetermined maximum carriage height when the fork carriage height value is greater than the predetermined maximum carriage height.

15. The method of claim 14, wherein the predetermined maximum carriage height is a maximum possible carriage height.

16. The method of claim 11, including the step of adjusting the fork carriage height value to a predetermined maximum carriage height when the fork carriage height value is less than the predetermined minimum carriage height.

17. The method of claim 16, wherein the predetermined minimum carriage height is the height of the carriage in a completely lowered position.

* * * * *